United States Patent [19]
Davis

[11] Patent Number: 6,052,911
[45] Date of Patent: Apr. 25, 2000

[54] LASER CENTERING APPARATUS

[76] Inventor: William R. Davis, P.O. Box 56, Grenada, Miss. 38902

[21] Appl. No.: 09/034,477

[22] Filed: Mar. 4, 1998

Related U.S. Application Data

[63] Continuation of application No. 08/589,556, Jan. 22, 1995, abandoned.

[51] Int. Cl.[7] ................................................ G01B 11/26
[52] U.S. Cl. ........................ 33/286; 33/529; 33/DIG. 21
[58] Field of Search ..................... 33/286, 529, DIG. 21, 33/533, 645, 644, 412, 281, 282, 283, 285, 290, 661, 520

[56] References Cited

U.S. PATENT DOCUMENTS

| | | | |
|---|---|---|---|
| 2,636,273 | 4/1953 | Morris | 33/281 |
| 2,822,623 | 2/1958 | Legois | 33/DIG. 1 |
| 4,580,345 | 4/1986 | Andrew | 33/529 |
| 5,539,990 | 7/1996 | Le | 33/281 |

*Primary Examiner*—Christopher W. Fulton
*Attorney, Agent, or Firm*—David L. Ray

[57] ABSTRACT

A laser centering apparatus including a frame for supporting a laser, the frame being adapted for selective attachment to a pipe, and a laser rotatably connected to the frame. The laser can be rotated in a plane containing the centerline of an existing pipe to enable quick and easy alignment of pipes parallel to an existing pipe.

2 Claims, 3 Drawing Sheets

LASER CENTERING APPARATUS

This is a continuation, of application Ser. No. 08/589,556, filed Jan. 22, 1995, now abandoned.

BACKGROUND OF THE INVENTION

1. Field of the Invention

The invention relates to devices for laying out pipe using a laser. More particularly, the present invention relates to pipe layout devices employing a laser for locating, positioning, centering, and placing pipes in predetermined locations.

2. Description of the Related Art

Devices for laying out pipe and centering pipe are known in the art. However, there is a need in the art for a faster and easier way to pull measurements, checking differences in elevations, and do limited lay-out work when fabricating pipe such as piping work on manifolds or headers. Such tasks are commonly performed with plumb bobs or plumb lines, string levels, squares and center finders or centering tools. A common task of pipe fitters in running or working pipe is to pull measurements from one fixed point to another point for a center to center measurement.

Exemplary of the Patents of the related art are the following U.S. Pat. Nos.: 4,580,345; 3,599,336; 3,505,739; 2,834,116; 2,822,623; 2,572,999; 2,502,660; and 1,649,764.

SUMMARY OF THE INVENTION

In accordance with the present invention there is provided a laser centering apparatus including a frame for supporting a laser, the frame being adapted for selective attachment to a pipe, and a laser rotatably connected to the frame.

The present invention has the advantage of enabling quick and easy alignment of pipes parallel to an existing pipe.

DESCRIPTION OF THE PREFERRED EMBODIMENTS

Figure 1:
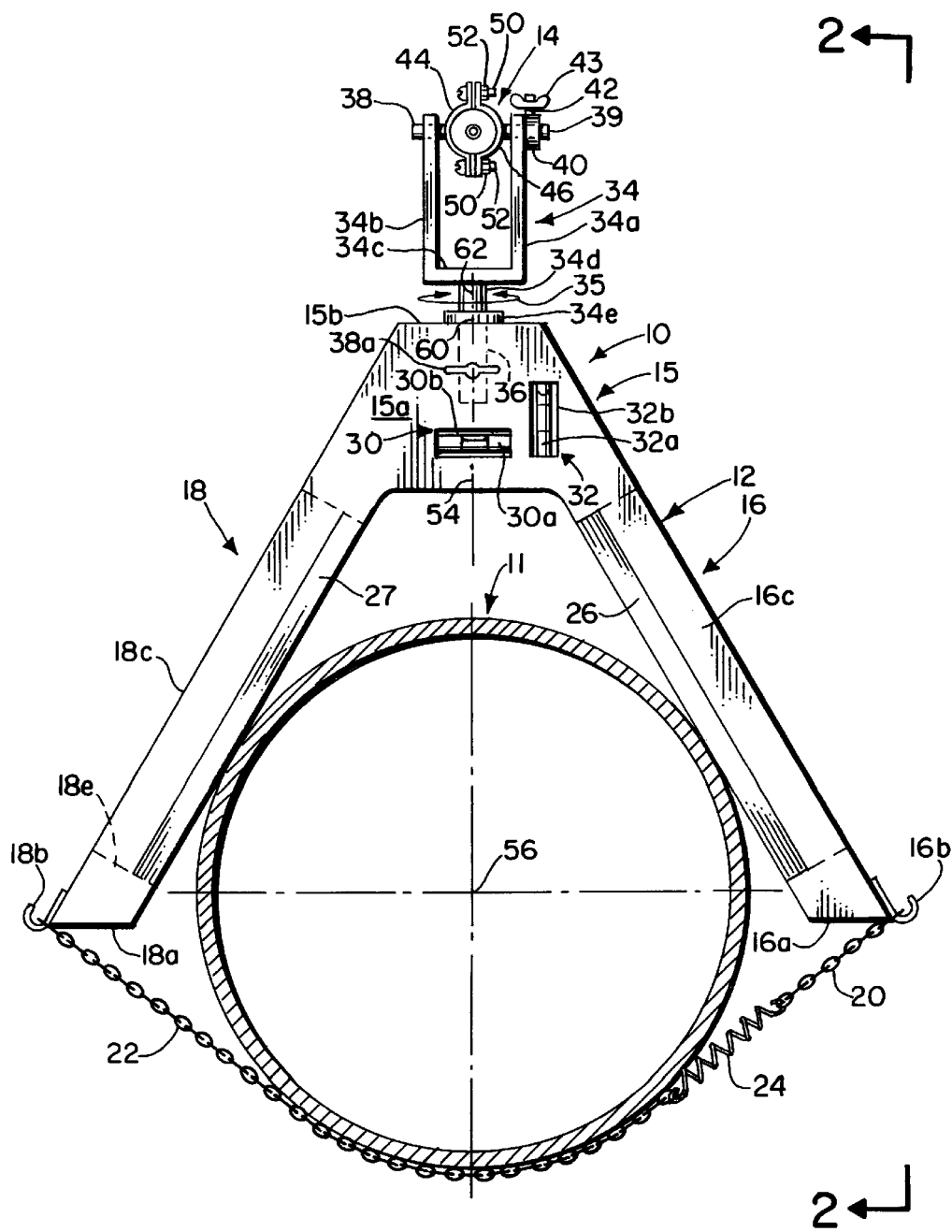
FIG. 1 is a front elevational view of the centering apparatus of the invention placed on a pipe.

Referring now to the drawings, in FIG. 1 is shown the centering apparatus of the invention generally indicated by the numeral 10 connected to the top of horizontally aligned pipe 11. Centering apparatus 10 has a frame generally indicated by the numeral 12 with a laser generally indicated by the numeral 14 rotatably mounted thereon.

Frame 12 has a top portion or crown generally indicated by the numeral 15 from which two legs generally indicated by the numerals 16 and 18 extend. Legs 16 and 18 have flat bottom ends 16a and 18a, both of which lie in a single plane, for standing on a flat planar surface such as concrete, brick, or metal plate. Hooks 16b and 18b are connected to legs 16 and 18 respectively for receipt of chains 20 and 22, respectively. Chains 20 and 22 are connected together by spring 24 to hold centering apparatus on pipe 11. If desired, chains 20 and 22 could be replaced by strap such as an elastic strap.

Figure 2:
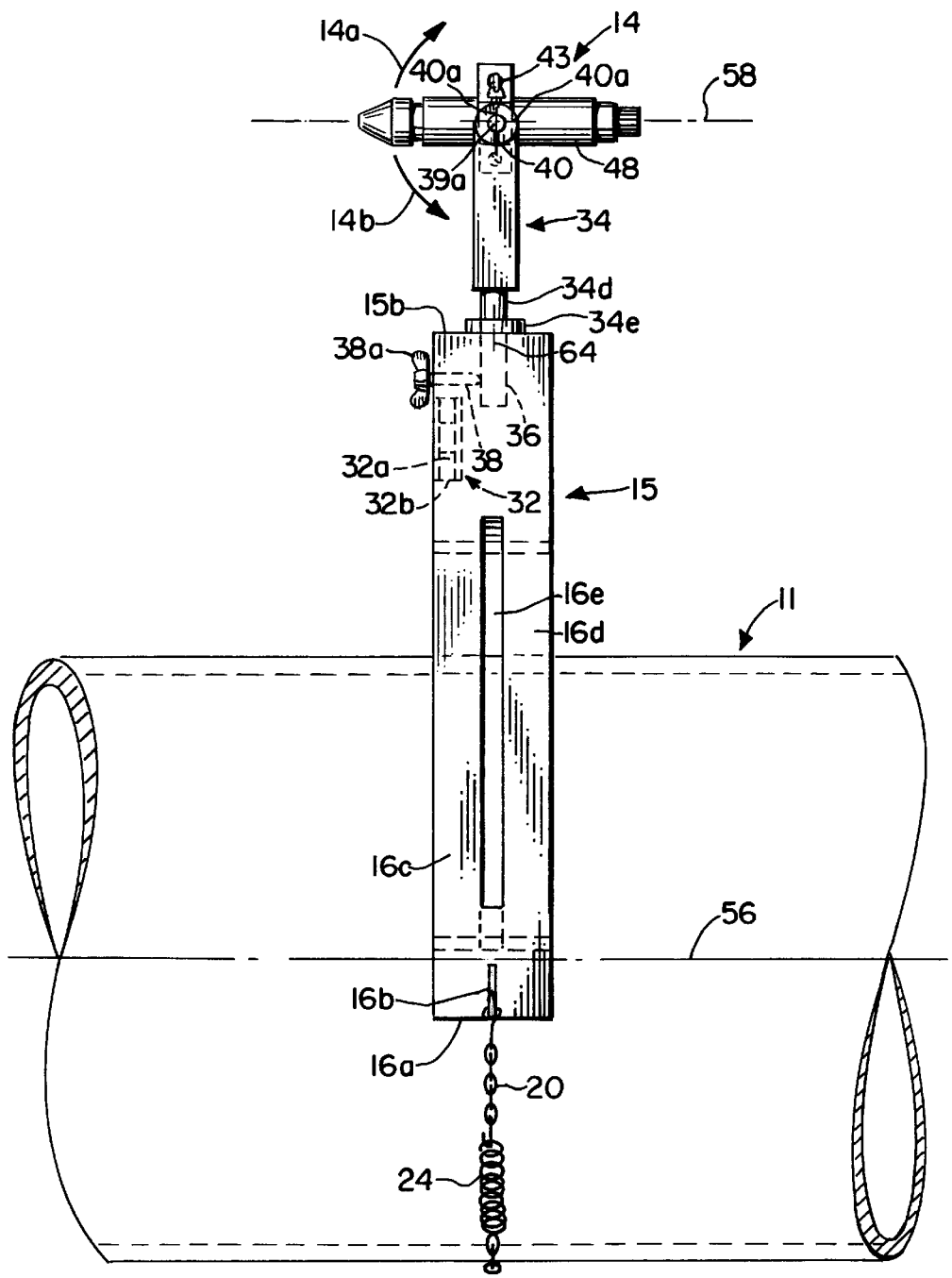
FIG. 2 is a side, elevational view of the centering apparatus of the invention taken along line 2—2 of FIG. 1.
Figure 3:
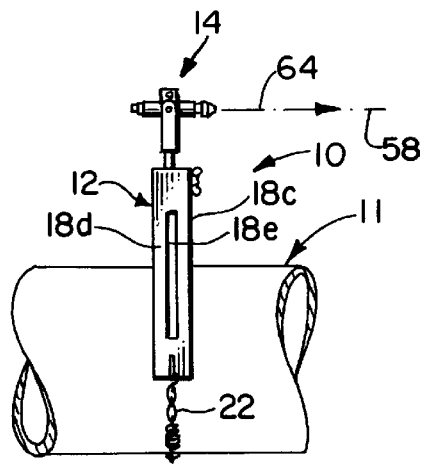
FIG. 3 is a side, elevational view of the centering apparatus of the invention shown in FIG. 1 transmitting a laser beam of light parallel to the centerline of the pipe.
Figure 4:
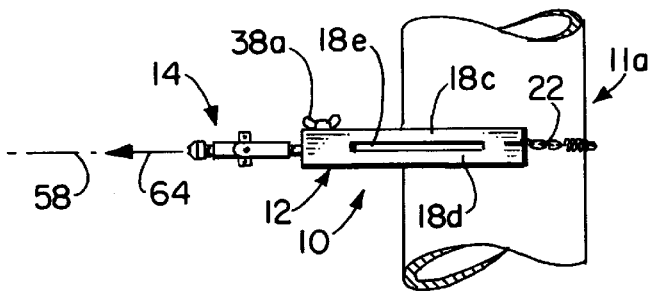
FIG. 4 is a top, plan view of the centering apparatus of the invention shown in FIG. 1 connected to a vertical pipe and transmitting a laser beam of light perpendicular to the centerline of the pipe.
Figure 5:
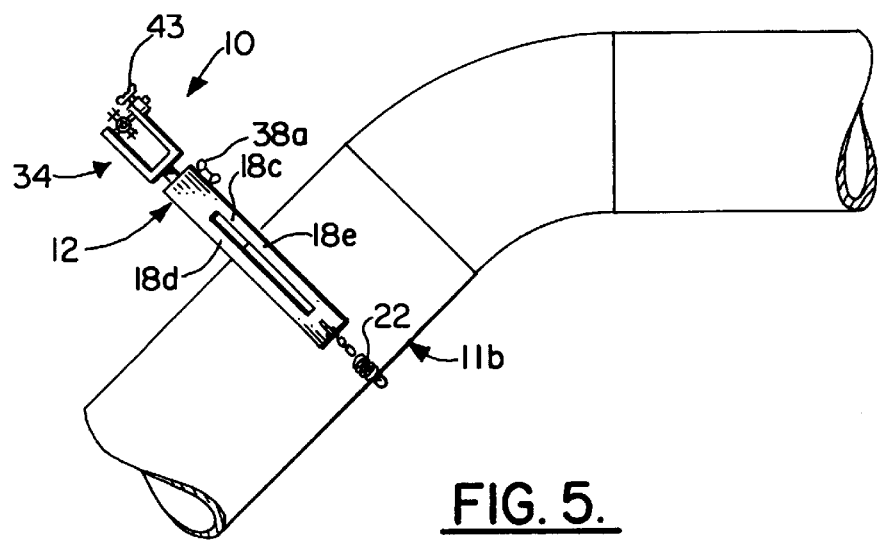
FIG. 5 is an elevational view of the centering apparatus of the invention shown in FIG. 1 connected to a pipe section aligned at an acute angle with the horizontal.

As can best be seen in FIG. 2, leg 16 preferably has two parallel portions 16c and 16d separated by a slot 16e therebetween. Leg 18 preferably is identical to Leg 16 and has two parallel portions 18c and 18d separated by a slot 18e therebetween as shown in FIGS. 3–5. A magnet 26 is preferably rigidly connected to the inside of each of the parallel portions 16c and 16d, and a magnet 27 is preferably connected to the inside of each of the parallel portions 18c and 18d, to help hold centering apparatus 10 on pipe 11. When centering apparatus is connected to a pipe such as pipe 11, and the laser 14 is in the position shown in FIGS. 1, 2, and 3, the centerline 58 of laser 14 will be parallel to the centerline of the pipe to which centering apparatus 10 is connected.

Legs 16 and 18 are connected at their top ends to crown 15 and are preferably integrally formed therewith. Crown 15 has two leveling devices generally indicated by the numerals 30 and 32 incorporated therein. Leveling devices 30 and 32 are preferably bubble levels 30a and 32a known in the art such as those used on a transit or carpenter's level. Leveling devices 30 and 32 are mounted in slots 30b and 32b adjacent to the outer surface 15a of crown 15 for viewing by the user. Bubble levels 30a and 32a are aligned with their longitudinal axes perpendicular to each other as shown in FIG. 1.

Laser 14 is rotatably supported by the laser support frame generally indicated by the numeral 34. Laser support frame 14 includes a U-shaped bracket having two vertical arms 34a and 34b extending upwardly from base 34c. Base 34c is rigidly connected to cylindrical post 34d which is received in cylindrical channel 36 in crown 15. A bolt 38 having wing nut 38a rigidly connected thereto is received in a threaded channel in crown 15 to lock cylindrical post 34d in a desired position. Cylindrical post 34d has a cylindrical washer 34e rigidly connected thereto which rests against the top face 15b of crown 15. Thus cylindrical post 34d and laser support frame 34 can be rotated as indicated by the arrow 35 any desired amount, such as 90°, 180°, or 360°, by loosening bolt 38, rotating to the desired position, and tightening bolt 38.

Two axially aligned rotatable pins 38 and 39 are located in the upper arms of vertical arms 34a and 34b of laser support frame 34. Rotatable pin 39 extends through hollow cylindrical sleeve 40. Hollow cylindrical sleeve 40 is rigidly connected to the outside of vertical arm 34a of laser support frame 34 and has bolt 42 threadably received therein for locking pin 39 in a desired position. Bolt 42 has wings 43 thereon for easy turning. To rotate laser 14 in a plane containing centerline 56 of pipe 11 as indicated by arrows 14a and 14b, bolt 42 is loosened, laser 14 is rotated to the desired position, and bolt 42 is tightened to lock laser 14 in the desired position. As shown in FIG. 2, indicia 39a is placed on the outside of rotatable pin 39 to indicate the direction in which laser 14 is pointing, and a plurality of indicia 40a are placed on the outside cylindrical sleeve 40 at various desired positions to indicate the angle at which laser 14 is pointing. As many indicia as desired may be placed on the outside of cylindrical sleeve 40 to assist in rotating laser 14 to various positions as desired by the user.

Rotatable pins 38 and 39 are rigidly connected to laser clamps 44 and 46, respectively. Laser clamps are semicircular clamps which are forced against laser housing 48. Laser clamps 44 and 46 are forced against laser housing 48 by bolts 50—50 and nuts 52—52.

As shown in FIG. 1, the centerline 54 of frame 12 is vertically aligned with the centerline 56 of horizontally aligned pipe 11. Centerline 56 is horizontal to the ground level. Bubble level 30 is utilized by a pipe fitter or other user to align the centerline 56 of frame 12 with the centerline 56 of pipe 11. The longitudinal axis 58 of laser 14 is shown in FIG. 2 to be aligned with the vertical plane containing the centerline 56 of pipe 11. Indicia 60 is placed on cylindrical washer 34e and indicia 62 is placed on cylindrical post 34d. When indicia 62 is aligned with indicia 60, the longitudinal axis of laser 14 is aligned with the centerline 54 of frame 12. As shown in FIG. 2, an indicia 63 is located on cylindrical washer 34e at a location 90°. from indicia 60. Thus, laser 14 shown in FIG. 1 may be rotated on cylindrical post 34d to align indicia 62 with indicia 60 and then the longitudinal axis of laser 14 will be perpendicular to the centerline 56 of pipe 11. As many indicia as desired may be placed on the outside of cylindrical washer 34e to assist in rotating laser 14 to various positions as desired by the user.

If desired, centering apparatus 10 may be rotated on pipe 11 90° clockwise or counter clockwise from the vertical position shown in FIG. 1 and bubble level 32 would be used to position centering apparatus 10 precisely at 90° from the vertical position shown in FIG. 1; the centerline 54 of centering apparatus 10 would then be perpendicular to the centerline 56 of pipe 11 and lie in the horizontal plane containing centerline 56. Furthermore, the centering apparatus may be rotated 180° from the position shown in FIG. 1 if desired, and bubble level 30 would be used to position centering apparatus 10 precisely 180° from the position shown in FIG. 1.

In FIG. 3 centering apparatus 10 is shown from the opposite side shown in FIG. 1. A beam 64 of laser light is being projected from laser 14 parallel to centerline 56 of pipe 11.

In FIG. 4 centering apparatus 10 is shown connected to vertical pipe 11a. A beam 64 of laser light is being projected horizontally from laser 14 perpendicularly to the centerline of pipe 11a.

In FIG. 5 centering apparatus 10 is shown connected to pipe 11b which has a centerline which forms an angle with the horizontal of approximately 45°. A beam 64 of laser light could be projected from laser 14 perpendicular to the centerline of pipe 11b.

To use the centering apparatus of the invention, the apparatus may be placed on a horizontal pipe as shown in FIG. 1 and 2, and chain 20 attached to hooks 16b and 18b. Legs 16b and 18b are rotated on pipe 11 until bubble level 30a is level. The longitudinal axis of laser 14 is now aligned in the vertical plane containing the centerline 56 of pipe 11. If indicia 60 and 62 are aligned, and indicia 39a is aligned with the appropriate indicia 40a parallel to the centerline 56, the longitudinal axis of laser 14 will be parallel to centerline 56. As laser 14 is rotated about pin 38 and 39, the longitudinal axis 58 of laser 14 will remain in the vertical plane containing the centerline 56. Therefore, if a pipe is desired to be located above pipe 11 with the centerline aligned therewith, laser 14 can be rotated upwardly to align and mark the centerline of the upper pipe, and if desired, appropriate marks and lines can be made on the ceiling or wall or other structure in the area where the beam projected from laser 14 to assist in aligning the new pipe parallel to the old pipe. Once the centerline of the new pipe is located with apparatus 10, the new pipe can be leveled using conventional levels or other conventional devices known in the art.

The same procedure may be followed when the centering apparatus 10 is rotated 90° or 180° from the position shown in FIG. 1. When apparatus 10 is rotated 90° from the position shown in FIG. 1, it may be used to align pipes to each side of pipe 10 with the centerline of pipe 10. When apparatus 10 is rotated 180° from the position shown in FIG. 1, it may be used to align pipes beneath pipe 10 with the centerline of pipe 10.

Those skilled in the pipe fitting art may find many other uses and procedures for using the centering apparatus 10 of the invention. Other uses may also be found for the centering apparatus 10 of the invention in other building trades such as carpentry and the like.

Although the preferred embodiments of the invention have been described in detail above, it should be understood that the invention is in no sense limited thereby, and its scope is to be determined by that of the following claims:

What is claimed is:

1. A one-unit laser pipe centering and layout apparatus for locating, positioning, centering, and placing pipes in predetermined locations consisting essentially of a frame means for supporting a laser, said frame means having two leg means connected by a crown for contacting the surface of a pipe for selective attachment to said pipe, said two leg means having magnets thereon which contact the surface of said pipe to hold said frame means thereon, said laser being rotatably connected to said frame means by a rotatable support frame, said laser being rotatable in a plane containing the centerline of said pipe and in a plane perpendicular to the centerline of said pipe, said frame means having level means connected thereto for aligning said laser with the centerline of said pipe, said level means being adapted to align said laser vertically above and vertically below said centerline of said pipe, said level means being adapted to align said laser horizontally to said centerline of said pipe.

2. A one-unit laser pipe centering and layout apparatus for locating, positioning, centering, and placing pipes in predetermined locations consisting of a frame means for supporting a laser, said frame means having two leg means connected by a crown for contacting the surface of a pipe for selective attachment to said pipe, said two leg means having magnets thereon which contact the surface of said pipe to hold said frame means thereon, said laser being rotatably connected to said frame means by a rotatable support frame, said laser being rotatable in a plane containing the centerline of said pipe and in a plane perpendicular to the centerline of said pipe, said frame means having level means connected thereto for aligning said laser with the centerline of said pipe, said level means being adapted to align said laser vertically above and vertically below said centerline of said pipe, said level means being adapted to align said laser horizontally to said centerline of said pipe.

* * * * *